United States Patent [19]

Satoh et al.

[11] Patent Number: 5,521,251
[45] Date of Patent: May 28, 1996

[54] PROPYLENE RANDOM COPOLYMER COMPOSITION

[75] Inventors: Makoto Satoh; Ritsuo Setoh, both of Ichihara, Japan

[73] Assignee: Sumitomo Chemical Co., Ltd., Osaka, Japan

[21] Appl. No.: 324,968

[22] Filed: Oct. 18, 1994

[30] Foreign Application Priority Data

Oct. 20, 1993 [JP] Japan .................................. 5-262340

[51] Int. Cl.$^6$ ............................ C08L 23/12; C08L 23/14; C08L 23/20
[52] U.S. Cl. ................................ 525/240; 524/528
[58] Field of Search ............................................. 525/240

[56] References Cited

U.S. PATENT DOCUMENTS

| | | |
|---|---|---|
| 2,956,042 | 10/1960 | Underwood et al. . |
| 3,634,546 | 1/1972 | Hagemeyer et al. . |
| 4,186,240 | 1/1980 | Matsuda et al. . |
| 4,211,852 | 7/1990 | Matsuda et al. ........................ 525/240 |
| 4,336,351 | 6/1982 | Cinadr . |
| 4,461,872 | 7/1984 | Su . |
| 4,645,792 | 2/1987 | Chatterjee . |
| 4,652,489 | 3/1987 | Crass et al. . |

FOREIGN PATENT DOCUMENTS

| | | |
|---|---|---|
| 0538749 | 4/1993 | European Pat. Off. . |
| 2404025 | 4/1979 | France . |
| 60-72948 | 4/1985 | Japan . |
| 1575894 | 10/1980 | United Kingdom . |

*Primary Examiner*—Carman J. Seccuro, Jr.
*Attorney, Agent, or Firm*—Sughrue, Mion, Zinn, Macpeak & Seas

[57] ABSTRACT

A propylene random copolymer composition which contains a mixture of 0.05–2.7% by weight of a crystalline propylene homopolymer (A) and 97.3–99.95% by weight of a random copolymer (B) of propylene and at least one α-olefin other than propylene which copolymer has a bound propylene content of 40–85% by weight and a Mw/Mn of not more than 5.5 meets both of the two mutually conflicting requirements of further improving the transparency inherent to polypropylene sheet and film, and attaining excellent solvent resistance.

8 Claims, 2 Drawing Sheets

PROPYLENE RANDOM COPOLYMER COMPOSITION

FIELD OF THE INVENTION

The present invention relates to a propylene copolymer composition. More specifically, it relates to a propylene copolymer composition which gives molded articles having a good balance between solvent resistance and transparency and exhibits a quite satisfactory heat sealability when formed into a film.

BACKGROUND OF THE INVENTION

Polypropylenes, which have many desirable physical properties, have been applied to a wide variety of uses. For example, they have been widely used in the field of packaging films. In this field of use they are generally supplied as propylene random copolymers in which propylene is randomly copolymerized usually with ethylene and/or an α-olefin other than propylene in order to improve the heat sealability at low temperatures. Such propylene random copolymers have a low crystallinity, low melting point, high transparency and high heat sealability attributable to highly random copolymerization of the comonomers. However, they have a problem of remarkable increase of solubility to organic solvents (e.g. saturated hydrocarbon solvents), which may threaten the safety of foods, with the increase of the content of ethylene and/or an α-olefin other than propylene.

On the other hand, there has been known a method for improving the blocking resistance and mechanical strength of propylene random copolymer compositions by modifying a random copolymer of propylene and an α-olefin other than propylene by incorporating thereinto 5–50% by weight of an isotactic polypropylene (JP-A-54-48846 and JP-A-54-95684). However, the method merely serves to keep the level of transparency and heat sealability at low temperatures. It is still unsatisfactory to meet the requirement to provide a propylene random copolymer composition with a good balance between solvent resistance and transparency. Specifically, increasing the proportion of isotactic polypropylene for improving the solvent resistance broadens the distribution of the composition and adversely affects the transparency. Use of random copolymers of low crystallinity alone for improving the transparency, in turn, notably reduces the solvent resistance. Thus, the method cannot solve the problem underlying the present invention.

There have also been known various methods for improving the transparency of propylene random copolymer compositions by adding thereinto any nucleating agent (JP-A-59-164348, JP-A-62-132937 & JP-A-2- 51548). However, nucleating agents are generally expensive due to their complicated structure and technical difficulty in production. Therefore, these methods are not industrially practical in view of the cost factor.

SUMMARY OF THE INVENTION

The present inventors have made extensive studies to develop a propylene random copolymer which can meet both of the two mutually conflicting requirements, that is, to further improve the good transparency inherent to polypropylene sheet and film and to attain excellent solvent resistance, which copolymer has not been obtainable by the prior art methods mentioned above. As the result, the inventors have found that the object can be attained by a specific propylene random copolymer composition and thus accomplished the present invention.

According to the present invention, there is provided a propylene random copolymer composition which comprises a mixture consisting of 0.05–2.7% by weight of a crystalline propylene homopolymer (A) and 97.3–99.95% by weight of a random copolymer (B) of propylene and at least one α-olefin other than propylene, the copolymer having a bound propylene content of 40–85% by weight and a Mw/Mn of not more than 5.5.

The composition may be free from a nuclearing agent.

Hereinafter the term "random copolymer (B) of propylene and at least one α-olefin other than propylene" is called "propylene random copolymer (B)" for short.

BRIEF DESCRIPTION OF THE DRAWINGS

In FIGS. 1 and 2, the numerals 1 to 11 represent Examples 1 to 11, respectively; and the numerals 21 to 28 represent Comparative Examples 1 to 8, respectively.

DETAILED DESCRIPTION OF THE INVENTION

Figure 1:
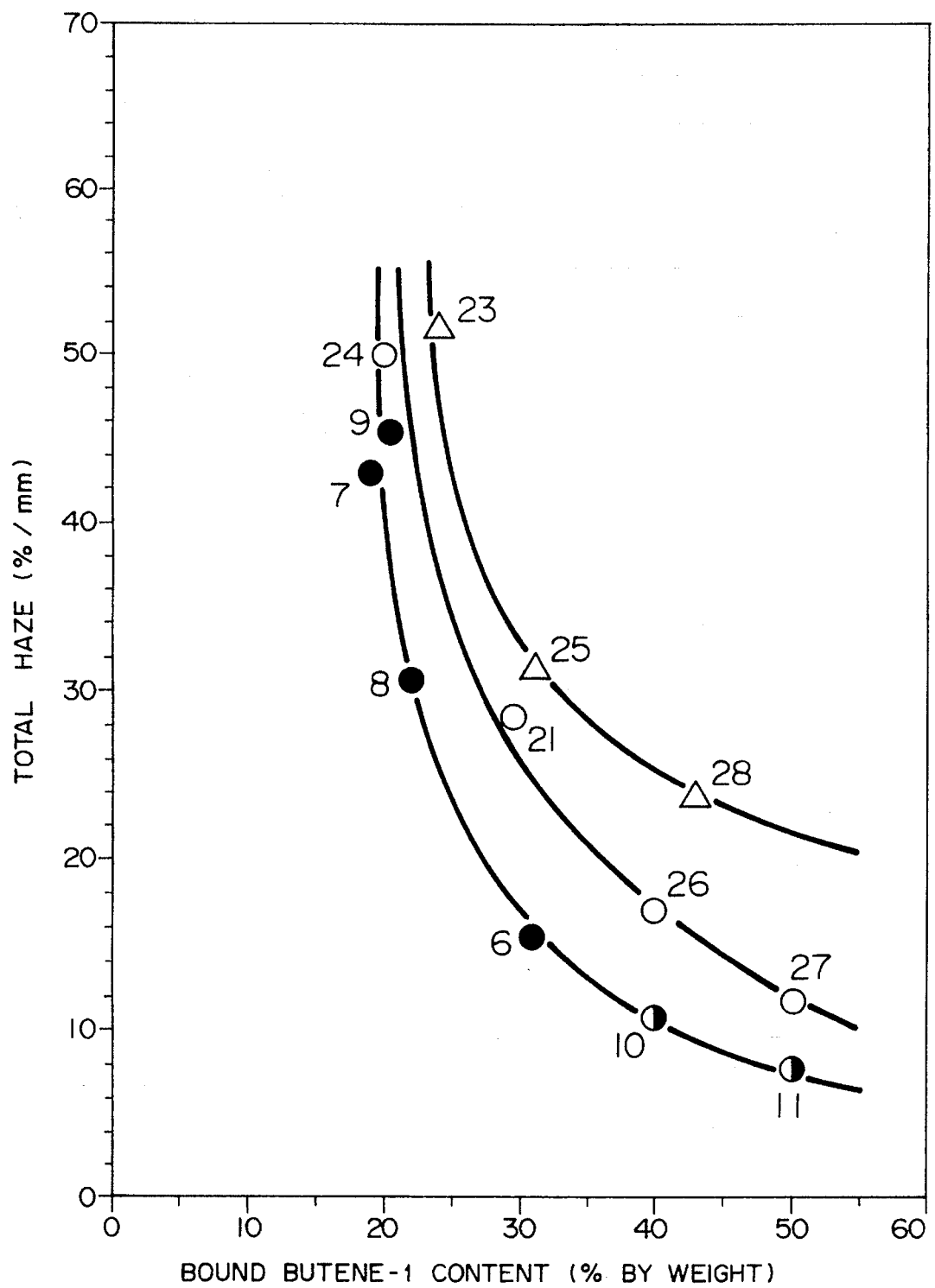
FIG. 1 presents a family of curves of total haze of a pressed sheet vs. bound butene-1 content at different types of propylene random copolymer compositions in Examples and Comparative Examples of the present invention.
Figure 2:
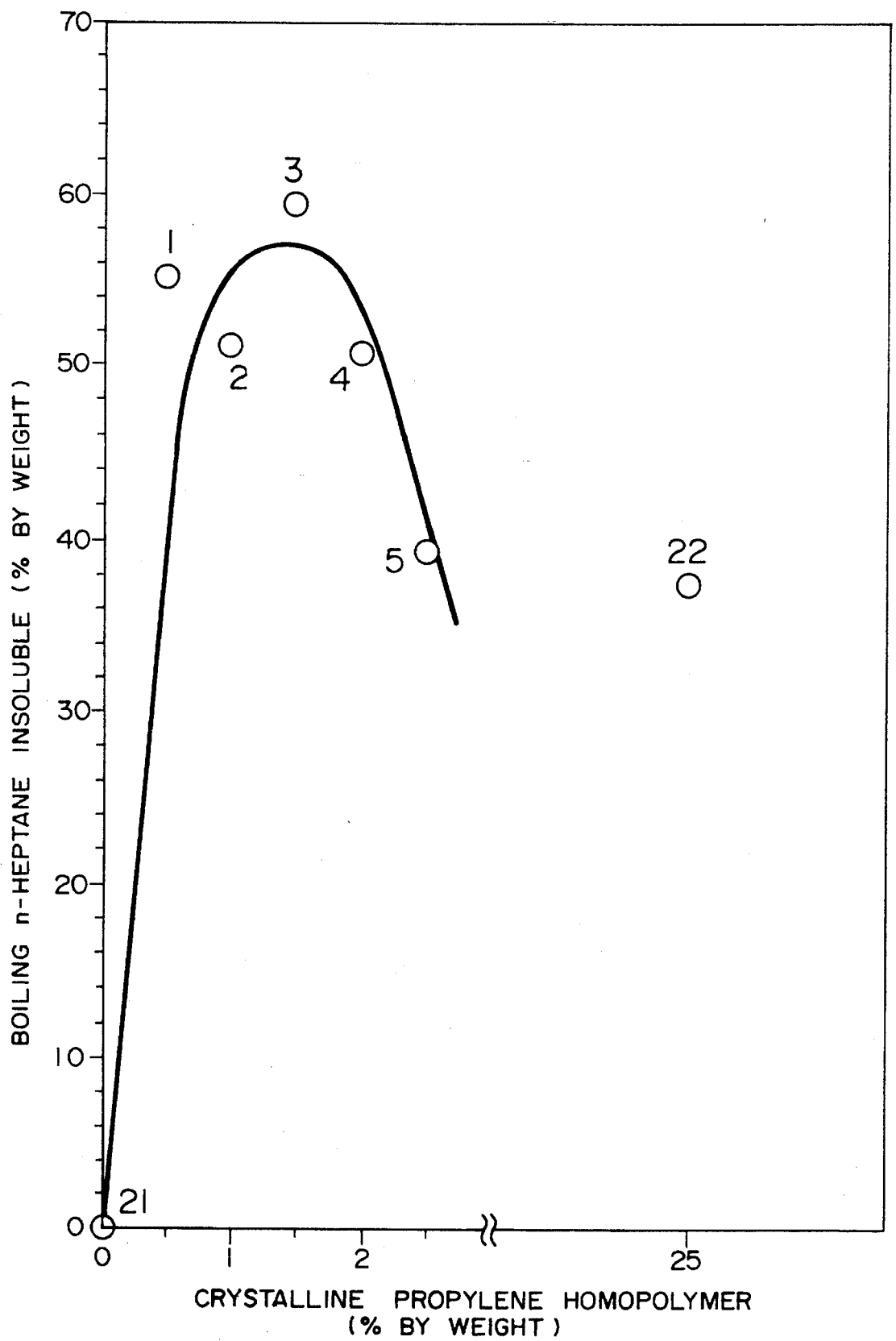
FIG. 2 presents a curve of content of crystalline propylene homopolymer present in a propylene random copolymer composition vs. amount of boiling n-heptane isoluble in Examples and Comparative Examples of the present invention.

In the present invention, the term "crystalline propylene homopolymer (A)" refers to crystalline propylene homopolymers as well as polypropylenes copolymerized with a small amount (for example, approximately 7% or less) of an α-olefin other than propylene (e.g. ethylene, butene-1). The crystalline propylene homopolymers can usually be obtained by homopolymerizing propylene in the presence of a Ziegler-Natta catalyst. Preferably, the crystalline propylene homopolymer (A) has a melting point determined by a differential scanning calorimeter of 150° C. or higher, and more preferably 155° C. or higher.

The propylene random copolymer (B) used in the propylene random copolymer composition of the present invention is a copolymer of propylene and at least one α-olefin other than propylene having a bound propylene content of from 40 to 85% by weight and a Mw/Mn of not more than 5.5. Preferably, the α-olefin has 4 to 10 carbon atoms, and more preferably it is butene-1.

When the bound propylene content is less than 40% by weight, the solvent resistance of the resulting composition is low. When the bound propylene content is more than 85% by weight, the heat sealability of the resulting composition is low.

When the Mw/Mn of the propylene random copolymer (B) is more than 5.5, the transparency of the resulting composition is very low.

The propylene random copolymer (B) can also be obtained by decomposing a random copolymer of propylene and at least one α-olefin other than propylene having a Mw/Mn higher than 5.5 by heat or a peroxide to reduce the Mw/Mn to 5.5 or lower.

The intrinsic viscosity [η] of the propylene random copolymer (B) falls within the range of 0.3–6.0 dl/g, 0.8–6.0 dl/g and 1.0–3.0 dl/g, with increasing preference.

The propylene random copolymer (B) can be produced by copolymerizing propylene with at least one α-olefin other than propylene generally using a Ziegler-Natta catalyst, but a soluble catalyst such as metallocene catalyst may also be used as occasion demands.

As a preferred catalyst system, there can be referred to a Ziegler-Natta catalyst system at least comprising titanium, magnesium, a halogen and an electron donor as essential constituents, for example a catalyst system comprising:

(a) a solid catalyst component containing titanium, magnesium, a halogen and an electron donor as essential constituents,
(b) an organometallic compound, and
(c) a silicon compound represented by the formula $R^1R^2Si(OR^3)_2$, wherein $R^1$ is an alicyclic hydrocarbon group having 5–20 carbon atoms, and $R^2$ and $R^3$ are each independently a hydrocarbon group having 1–20 carbon atoms.

The solid catalyst component (a) in the above-mentioned catalyst system contains titanium, magnesium and a halogen as essential constituents and can generally be obtained by reducing a titanium compound with an organomagnesium compound to obtain a solid product, and treating the solid product with an ester compound and then with titanium tetrachloride.

The titanium compound is represented by the formula $Ti(OR)_bX_{4-b}$, wherein R is a hydrocarbon group having 1–20 carbon atoms, X is a halogen atom, and b is a number meeting the inequality, $0<b\leq 4$. Specific examples of R include alkyl groups, such as methyl, ethyl, isopropyl, butyl, isobutyl, amyl, isoamyl, hexyl, heptyl, octyl, decyl and dodecyl; aryl groups, such as phenol, cresyl, xylyl and naphthyl; cycloalkyl groups, such as cyclohexyl and cyclopentyl; allyl groups, such as propenyl; and aralkyl groups, such as benzyl.

The magnesium component used may be any type of organomagnesium compound containing a magnesium-carbon bond. Particularly preferred are Grignard reagents represented by the formula RMgX, wherein R is a hydrocarbon group having 1–20 carbon atoms and X is a halogen, and magnesium compounds represented by the formula RR'Mg, wherein R and R' may be the same or different and are each a hydrocarbon group having 1–20 carbon atoms.

Examples of the Grignard compound include methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, phenylmagnesium chloride, phenylmagnesium bromide, etc. Examples of the magnesium compound represented by the formula RR'Mg include diethylmagnesium, dipropylmagnesium, diisopropylmagnesium, dibutylmagnesium, di-sec-butylmagnesium, di-tert-butylmagnesium, butyl-sec-butylmagnesium, diamylmagnesium, diphenylmagnesium, etc.

The organoaluminum compound (b) used in combination with the solid catalyst component (a) has at least one Al-carbon bond in the molecule.

Specific examples of such organoaluminum compounds include trialkylaluminums, such as triethylaluminum, triisobutylaluminum and trihexylaluminum; dialkylaluminum halides such as diethylaluminum halides and diisobutylaluminum halides; mixtures of trialkylaluminums with dialkylaluminum halides; and alkylalumoxanes, such as tetraethyldialumoxane and tetrabutyldialumoxane.

Among these organoaluminum compounds, preferred are trialkylaluminums, mixtures of trialkylaluminums with dialkylaluminum halides and alkylalumoxanes, and particularly preferred are triethylaluminum, triisobutylaluminum, a mixture of triethylaluminum with diethylaluminum chloride and tetraethyldialumoxane.

The organoaluminum compound may also be used in combination with a born compound, e.g., trityltetra(pentafluorophenyl) borate and N,N'-dimethylanilinium-tetra(pentafluorophenyl) borate.

The amount of the organoaluminum compound used may be selected from as wide a range as 1–1000 moles, preferably from a range of 5–600 moles, per 1 mole of titanium atom in the solid catalyst.

Examples of the silicon compound (c) of the electron donor represented by the formula $R^1R^2Si(OR^3)_2$ are as follows.

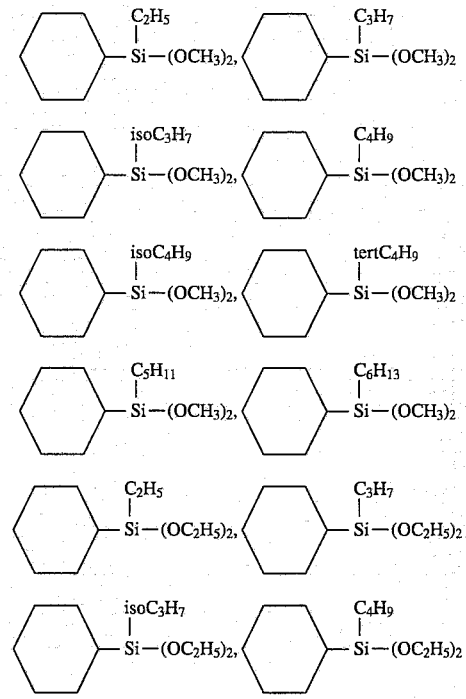

In the present invention, copolymerization of propylene with at least one α-olefin is carried out by using a catalyst system wherein the molar ratio of Al atoms in the component (b) to Ti atoms in the component (a) is 1–1000, preferably 5–600 and the molar ratio of Al atoms in the component (c) to Al atoms in the component (b) is 0.02–500, preferably 0.05–10, under conditions of a polymerization temperature of 20°–150° C., preferably 50°–95° C. and a polymerization temperature of atmospheric pressure –40 kg/cm$^2$G and supplying hydrogen into the polymerization system to control the molecular weight.

The mixture contained in the propylene random copolymer composition of the present invention consists of a crystalline propylene homopolymer (A) and a random copolymer (B) of propylene and at least one α-olefin other than propylene. The mixture may be obtained either by blending a crystalline propylene homopolymer (A) with a random copolymer (B) or by prepolymerizing propylene alone beforehand and then randomly copolymerizing propylene with at least one α-olefin other than propylene. EP-409492, EP-415588 and JP-B-63-12086 disclose that prepolymerizing propylene alone beforehand and then randomly copolymerizing propylene with at least one α-olefin other than propylene give a mixture of a crystalline propylene homopolymer and a random copolymer of propylene and said at least one α-olefin.

The mixture contained in the propylene random copolymer composition of the present invention consists of 0.05–2.7% by weight of a crystalline propylene homopolymer (A) and 97.3–99.95% by weight of a propylene random copolymer (B) having a bound propylene content of 40–85% by weight and a Mw/Mn of not more than 5.5. When the amount of the crystalline propylene homopolymer (A) is less than 0.05% by weight the resulting composition has an insufficient solvent resistance, whereas when it is larger than 2.7% by weight the resulting composition is poor in transparency. The amount of the crystalline propylene homopolymer (A) ranges preferably 0.1–2.5% by weight, more preferably 0.3–2.5% by weight.

The boiling n-heptane insoluble portion in the propylene random copolymer composition of the present invention usually shows a crystal melting peak attributable to crystalline propylene homopolymer (A) at 152°–168° C. in the DSC curve obtained by differential scanning calorimetric determination of the portion. The amount of melting heat of the melting peak varies depending on the amount of the crystalline propylene homopolymer (A) contained in the portion. When the peak is not detected, the copolymer composition cannot be a propylene random copolymer composition which can satisfy both of the two mutually conflicting characteristics of transparency and solvent resistance.

The propylene random copolymer composition of the present invention can be melt-pressed into sheets, whereby sheets and stretched film excellent in transparency and solvent resistance can be obtained without particular addition of a nucleating agent. Specific examples of the nucleating agent are phosphorus nucleating agents (e.g. sodium 2,2'-methylene-bis( 4,6-di-t-butylphenyl)phosphate), sorbitol nucleating agents (e.g. 1,3,2,6-di-(p-methylbenzilidene-)sorbitol) and polymer nucleating agents (e.g. polyvinyl cyclohexane).

The random copolymer composition of the present invention may, if necessary and desired, be incorporated with conventional antioxidants, neutralizing agents, lubricants, antiblocking agents, antistatic agents, and the like.

The present invention is described in detail below with reference to Examples, which, however, in no way limit the scope of the present invention.

The measured values of respective items shown in the present specification were determined by the following methods.

(1) Bound butene content

Butene-1 content: This was determined by $^{13}C$-nuclear magnetic resonance spectrometry.

(2) Weight average molecular weight (Mw)/Number average molecular weight (Mn)

This was determined by gel permeation chromatography (GPC) under the following conditions. The calibration curve was prepared by using standard polystyrene samples.

Apparatus, mfd. by Millipore Waters Corp. type 150 CV
Column, Shodex M/S 80
Measuring temperature, 145° C.,
Solvent, o-dichlorobenzene
Sample concentration, 5 mg/8 ml When the Standard Reference Material 706 (polystyrene having Mw/Mn of 2.1) of NBS (National Bureau of Standard) was examined under the above-mentioned conditions, a value of molecular weight distribution (Mw/Mn) of 2.1 was obtained.

(3) Boiling n-heptane insoluble

A 1 mm thick sheet obtained by molding according to JIS K 6758 is placed in a cylindrical glass filter and extracted with a Soxhlet's extractor for 14 hours. The frequency of reflux during the extraction is about once per 5 minutes. The percentage by weight of the insoluble is determined by weighing the insoluble.

(4) Transparency (haze)

Haze is a measure for representing the transparency of molded articles. In the present invention, the haze is determined according to JIS K 6714 with a 1 mm thick sheet molded according to JIS K 758.

The transparency of a film is determined according to JIS K 6714 with a piece of film cut into a dimension of about 50 mm×50 mm.

(5) Melting point (Tm)

By using a differential scanning calorimeter (DSC, mfd. by Perkin-Elmer Corp.), 10 mg of a sample is molten beforehand in nitrogen atmosphere at 220° C. for 5 minutes and then brought down to a temperature of 40° C. at a temperature decreasing rate of 5° C./min, to effect crystallization. Thereafter the sample is brought to elevated temperature at a rate of 10° C./min. to obtain a melting heat absorption curve. The temperature of the maximum peak of the curve is taken as the melting point.

The melting point of indium (In) determined by using the above-mentioned measuring apparatus at a temperature increasing rate of 10° C./min was 156.6° C.

(6) Heat seal temperature

Film sheets are placed one upon the other so that the sealant surfaces contact with each other, and press-sealed with a heated heat sealer under an applied load of 2 kg/cm$^2$ for 2 seconds to obtain film sheets sealed in a width of 25 mm. The thus sealed sheets are allowed to stand overnight. Thereafter the sealed film sheets are peeled at a peeling rate of 200 mm/min and a peeling angle of 180° to measure the peeling resistance force. The temperature of the heat sealer at which the peeling resistance force reaches 300 g/25 mm is taken as the heat seal temperature.

REFERENCE EXAMPLE (a) Synthesis of Organomagnesium Compound

A 1-1 flask equipped with a stirrer, reflux condenser, dropping funnel and thermometer was flushed with argon. Therein was placed 32.0 g of magnesium turnings for Grignard reagent. Then 120 g of butyl chloride and 500 ml of dibutyl ether were placed in the dropping funnel. About 30 ml of the resulting mixture was added dropwise to the magnesium in the flask to initiate a reaction. After initiation of the reaction, the dropwise addition was continued at 50° C. in the course of 4 hours. After completion of the addition the reaction was further continued at 60° C. for 1 hour. Thereafter, the reaction mixture was cooled to room temperature. The obtained solid was then separated by filtration.

The concentration of butylmagnesium chloride in dibutyl ether was determined by hydrolyzing the chloride with 1-N sulfuric acid, followed by back titration with 1-N aqueous sodium hydroxide solution using phenolphthalein as an indicator. The concentration was found to be 2.1 mol/l.

(b) Synthesis of Solid Product

A 500-ml flask equipped with a stirrer and dropping funnel was flushed with argon. Then 240 ml of hexane, 5.4 g (15.8 mmoles) of tetrabutoxytitanium and 61.4 g (295 mmoles) of tetraethoxysilane were placed therein to form a uniform solution.

Then, 150 ml of the organomagnesium compound synthesized in (a) was gradually added by drops from the dropping funnel in the course of 4 hours while keeping the temperature in the flask at 5° C. After completion of the dropwise addition the reaction mixture was stirred at room temperature for additional 1 hour. The obtained solid was separated from the liquid, washed repeatedly 3 times with 240 ml of hexane and then dried under reduced pressure to obtain 45.0 g of a brown solid product.

The solid product was found to contain 1.7% by weight of titanium atom, 33.8% by weight of ethoxy group and 2.9% by weight of butoxy group.

The solid product showed utterly no obvious diffraction peak in the wide angle X-ray diffraction pattern obtained by using Cu-Ka line. This fact demonstrates that the solid product was of an amorphous structure.

(c) Synthesis of Ester-treated Solid

A 100-ml flask was flushed with argon. Then 6.5 g of the solid product obtained in (b), 16.2 ml of toluene and 4.3 ml (16 mmoles) of diisobutyl phthalate were placed therein. The resulting mixture was allowed to react at 95° C. for 1 hour. After reaction, the reaction mixture was separated into solid and liquid products. The solid product was washed with toluene.

(d) Synthesis of Solid Catalyst (Activation Treatment)

After completion of washing in above (c), 16.2 ml of toluene, 0.36 ml (1.3 mmoles) of diisobutyl phthalate, 2.2 ml (13 mmoles) of butyl ether and 38.0 ml (346 mmoles) of titanium tetrachloride were added into the flask. The resulting mixture was allowed to react at 95° C. for 3 hours. After completion of the reaction, the obtained solid was separated from the liquid and washed twice with 33 ml of toluene at the same temperature. The above-mentioned treatment with a mixture of diisobutyl phthalate, butyl ether and titanium tetrachloride was repeated once more under the same conditions. The thus treated solid was washed 3 times with 33 ml of hexane to obtain 5.0 g of an ocherous solid catalyst. The solid catalyst contained 2.0% by weight of titanium atom and 15.6% by weight of phthalic ester.

(e) Preparation of Propylene Prepolymerization Catalyst

In a 500-ml reactor equipped with a stirrer was placed 100 ml of thoroughly purified hexane. The atmosphere in the system was thoroughly replaced with nitrogen. Thereafter 1.24 mmoles of triethylaluminum (hereinafter abbreviated as TEA), 0.124 mmoles of cyclohexyethyldimethoxysilane (hereinafter abbreviated as CHEDMS) and 0.01 g in terms of Ti atom of the solid catalyst obtained in the Referential Example (d) described above were added into the flask. With the temperature in the flask maintained at 20° C. or below, propylene was continuously fed into the flask while regulating the amount of absorbed propylene to obtain a catalyst of intended prepolymerization amount.

A small portion of the prepolymerization catalyst obtained above was deashed by addition of propylene oxide, kneaded with a small-sized roll mill for 3 minutes and then cut into pellets. The propylene homopolymer thus obtained showed a melting point of 163° C. as determined by using a differential scanning calorimeter.

COMPARATIVE EXAMPLE 1

A 3-l stirred stainless steel autoclave was flushed with nitrogen. 1.0 Liter of n-hexane purified by activated alumina treatment, 4.4 mmoles of triethylaluminum and 0.33 mmoles of cyclohexylethyldimethoxysilane were placed in the autoclave. A hydrogen pressure of 100 mm Hg was applied to the system. Then 87 g of liquefied propylene and 190 g of liquefied butene were charged into the autoclave. The temperature of the autoclave was raised to 50° C. Then 27 mg of the solid catalyst synthesized in above (d) was pressed thereinto as a hexane slurry with propylene gas to initiate a polymerization. The polymerization was continued under a pressure of about 4.0 kg/cm$^2$ at a temperature of 50° C. for 2 hours while feeding propylene gas into the system. After completion of the polymerization, the unreacted monomer was purged. 20 Milliliters of isobutanol was added to the resulting system as a short-stop. The isobutanol-added system was stirred for about 15 minutes at the same temperature. Thereafter, 3.0 ml of propylene oxide was added to the thus stirred system. The propylene oxide-added system was stirred for about 15 minutes in the same manner to be deashed. The content of the autoclave was poured into ethanol of about 4 times the amount to precipitate a polymer. The precipitated polymer was dried under reduced pressure at 60° C. for 4 hours to obtain 156 g of propylene-butene-1 copolymer.

The yield (number of gram) of propylene-butene-1 copolymer per gram of solid catalyst component (hereinafter abbreviated as PP/cat) was 5800.

To 100 parts by weight of the copolymer obtained above were added 0.2 part by weight of Sumilizer®-BHT (mfd. by Sumitomo Chemical Co., Ltd., 2,6-di-tert-butyl-4-methylphenol), 0.05 part by weight of Irganox® 1010 (mfd. by Ciba-Geigy Ltd., penta-erythrityl-tetrakis[ 3-(3,5-di-tert-butyl-4-hydroxyphenyl)propionate] ) and 0.1 part by weight of calcium stearate. The resulting mixture was blended on a small-sized roll mill for 10 minutes. The thus obtained copolymer composition was cut into pellets and then molded into a sheet of 1 mm thickness according to JIS K 6758. The sheet showed a total haze of 28.2%. The copolymer composition had a bound butene-1 content of 30.0% by weight as determined by $^{13}$C-nuclear magnetic resonance spectrometry, a melting point of 119° C. as determined with a differential scanning calorimeter, an intrinsic viscosity (hereinafter abbreviated as [η]) of 1.92 dl/g as determined in tetralin at 135° C. and a boiling n-heptane insoluble of 0.1% by weight.

A double layer lamination sheet of 90 mm square consisting of a propylene homopolymer portion (thickness: 500 μm) and a sealant portion (thickness: 100 μm) was prepared. The propylene homopolymer portion was made of Sumitomo Noblen® FS 2011D (melt index: 2.6) mfd. by Sumitomo Chemical Co., Ltd., and the sealant portion was made of the copolymer composition obtained above. With a bench-type biaxial stretching machine mfd. by Toyo Seiki Co., Ltd., the double layer lamination sheet was preheated at 150° C. for 3 minutes, and then stretched at a stretching rate of 5 m/min. and a draw ratio (machine direction×transverse direction) of 5×5, to obtain a film of 24 μm thickness. The thus obtained stretched film showed a heat seal temperature of 77° C. and a total haze of 3.0%.

EXAMPLE 1

A mixture of 0.5 Part by weight of pellets of a crystalline propylene homopolymer (hereinafter abbreviated as PP, mmmm pentad: 0.97, [η]: 1.83 dl/g, melting point: 165° C., density: 0.90 g/cm$^3$) and 99.5 parts by weight of the propylene-butene-1 copolymer obtained in Comparative Example 1, 0.2 part by weight of Sumilizer®-BHT, 0.05 part by weight of Irganox® 1010 and 0.1 part by weight of calcium stearate were blended with a small-sized roll mill for 10 minutes to obtain a propylene random copolymer composition. The thus obtained composition was formed into a sheet of 1 mm thickness according to JIS K 6758. The sheet obtained had a total haze of 26.0% and a boiling n-heptane insoluble of 55.3% by weight.

A double layer lamination sheet of 90 mm square consisting of a propylene homopolymer portion (thickness: 500 μm) and a sealant portion (thickness: 100 μm) was prepared. The propylene homopolymer portion was made of Sumitomo Noblen® FS 2011D (melt index: 2.6) mfd. by Sumitomo Chemical Co., Ltd., and the sealant portion was made of the random copolymer composition obtained above. With a bench-type biaxial stretching machine mfd. by Toyo Seiki Co., Ltd., the double layer lamination sheet was preheated at 150° C. for 3 minutes, and then stretched at a stretching rate of 5 m/min. and a draw ratio (machine direction×transverse direction) of 5×5, to obtain a film of 24 μm thickness. The thus obtained stretched film showed a heat seal temperature of 80° C. and a total haze of 0.4%.

EXAMPLES 2, 3, 4 AND 5

The same procedure as in Example 1 was repeated except for varying the amount of propylene-butene- 1 copolymer blended with PP as shown in Table 1. The properties of the obtained compositions are shown in Table 2.

COMPARATIVE EXAMPLE 2

A 3-l stirred stainless steel autoclave was flushed with nitrogen. 1.0 Liter of n-hexane purified by activated alumina treatment, 6.6 mmoles of triethylaluminum and 0.49 mmole of cyclohexylethyldimethoxysilane were placed in the autoclave. A hydrogen pressure of 100 mmHg was applied to the system. Then 85 g of liquefied propylene and 167 g of liquefied butene were charged into the autoclave. The temperature of the autoclave was raised to 50° C. Then 17 mg of the solid catalyst synthesized in section (d) of Referential Example was pressed thereinto as a hexane slurry with propylene gas to initiate a polymerization. The polymerization was continued under a pressure of about 4.0 kg/cm$^2$ at a temperature of 50° C. for 2 hours while feeding propylene gas into the system. After completion of the polymerization, the unreacted monomer was purged. 20 Milliliters of isobutanol was added to the resulting system as a short-stop. The isobutanol-added system was stirred for about 15 minutes at the same temperature. Thereafter, 3.0 ml of propylene oxide was added to the thus stirred system. The propylene oxyde-added system was stirred for about 15 minutes in the same manner to be deashed. The content of the autoclave was poured into ethanol of about 4 times the amount to precipitate a polymer. The precipitated polymer was dried under reduced pressure at 60° C. for 4 hours to obtain 139 g of propylene-butene- 1 copolymer.

The yield (number of gram) of propylene-butene- 1 copolymer per gram of solid catalyst component (hereinafter abbreviated as PP/cat) was 8200.

To 100 parts by weight of the copolymer obtained above were added 0.2 part by weight of Sumilizer®-BHT (mfd. by Sumitomo Chemical Co., Ltd. 2,6-di-tert-butyl-4-methylphenol), 0.05 part by weight of Irganox®1010 (mfd. by Ciba-Geigy Ltd., penta-erythrityl-tetrakis[ 3-(3,5-di-tert-butyl-4-hydroxyphenyl)propionate] ) and 0.1 part by weight of calcium stearate. The resulting mixture was blended on a small-sized roll kneader for 10 minutes. The thus obtained copolymer composition was cut into pellets and then molded into a sheet of 1 mm thickness according to JIS K 6758. The sheet showed a total haze of 28.7%. The copolymer composition had a bound butene-1 content of 29.6% by weight as determined by $^{13}$C-nuclear magnetic resonance spectrometry, a melting point of 113° C. as determined with a differential scanning calorimeter, an intrinsic viscosity (hereinafter abbreviated as [η]) of 1.78 dl/g as determined in tetralin at 135° C. and a boiling n-heptane insoluble of less than 0.1% by weight.

A double layer lamination sheet of 90 mm square consisting of a propylene homopolymer portion (thickness: 500 μm) and a sealant portion (thickness: 100 μm) was prepared. The propylene homopolymer portion was made of Sumitomo Noblen® FS 2011D (melt index: 2.6) mfd. by Sumitomo Chemical Co., Ltd., and the sealant portion was made of the copolymer composition obtained above. With a bench-type biaxial stretching machine mfd. by Toyo Seiki Co., Ltd., the double layer lamination sheet was preheated at 150° C. for 3 minutes, and then stretched at a stretching rate of 5 m/min. and a draw ratio (machine direction×transverse direction) of 5×5, to obtain a film of 24 μm thickness. The thus obtained stretched film showed a heat seal temperature of 84° C. and a total haze of 1.3%.

The same procedure as in Example 1 was repeated except that the proportions of PP and the propylene-butene-1 copolymer were varied as shown in Table 1. The properties of the obtained composition are shown in Table 2.

EXAMPLES 6 AND 7

A prepolymerization catalyst wherein propylene alone was polymerized was obtained according to the method described in section (e) of Referential Example and by regulating the amount of the absorbed propylene. By repeating the same procedure as in Comparative Example 1 using the prepolymerization catalyst while regulating the amounts of liquefied propylene and liquefied butene fed to the reactor, propylene-butene-1 copolymers having various bound butene-1 contents as shown in Table 1 were produced. Then propylene random copolymer compositions were obtained by using each of the thus produced propylene-butene- 1 copolymers. The properties of the obtained compositions are shown in Table 2.

EXAMPLE 8

Preparation of Prepolymerization Catalyst

An ocherous solid catalyst was obtained in the same manner as in section (d) of Referential Example. The solid catalyst contained 2.6% by weight of titanium atom and 15.3% by weight of phthalic ester.

In a 220-l reactor whose inner atmosphere had been thoroughly replaced with nitrogen, were placed 95.7 l of butane, 987 g of the solid catalyst, 2.5 moles of triethylaluminum and 0,375 mole of phenyltrimethoxysilane. Then the mixture in the reactor was allowed to absorb propyolene monomer at 20° C. for 3.6 hours. Thereafter, the resulting prepolymerization catalyst was recovered, separated from the solvent, and dried at 60° C. for 3 hours to obtain a solid catalyst component having a prepolymerization ratio (PP/cat) of 39 g-PP/g-cat. A part of the thus obtained solid catalyst component was deashed and roll-milled. The resulting product showed a melting point (Tm) of 165° C. as determined by DSC.

Production of Random Copolymer

Copolymerization of propylene and butene-1 were carried out by using a fluidized bed reactor having an inner volume of 1,000 l and equipped with a stirrer as follows. First, recycling nitrogen gas was fed from the lower part of the reactor at a flow rate of 120 m$^3$/hr. Then, 80 kg of propylene-butene-1 copolymer particles which had been dried and had surrounding atmosphere replaced with nitrogen beforehand was fed to serve for dispersing the catalyst, and the polymer particles were kept in a fluidized state. The inner pressure of the reactor was elevated up to 10 kg/cm$^2$G with propylene. The prepolymerization catalyst, triethylaluminum and phenyltrimethoxysilane were fed into the reactor in a rate of 63.6 g/hr, 59.4 mmoles/hr and 8.91 mmoles/hr, respectively. Thereafter hydrogen, propylene and butene-1 were fed so as to give a hydrogen concentration of 0.22% by mole and a butene-1 concentration of 23.8% by mole. The temperature of the fluidized bed was adjusted to 65° C. to initiate the polymerization. Part of the produced polymer particles were successively withdrawn from the reactor into a silo with the aide of pressure difference while maintaining 80 kg of the produced polymer particles remained in the reactor. Unreacted monomers were removed from withdrawn polymer particles. Then, methanol and Irganox® 1076 (mfd. by Ciba-Geigy Ltd., octadecyl-3-(3,5-di-tert-butyl-4-hydroxyphenyl)-propionate) were supplied to the monomer-free polymer particles in an amount of 0.0075 l and 0.0016 g per kilogram of the polymer particles, respectively. The resulting mixture was treated with hot nitrogen at 60° C. for 2 hours. Then, the thus treated mixture was further dried with hot nitrogen at 60° C. for 1.5 hours to obtain a white powdery polymer in a yield of 15.3 kg/hr. The physical properties of the polymer are shown in Table 1. The properties of the composition containing the polymer are shown in Table 2.

EXAMPLE 9

Preparation of Prepolymerization Catalyst

In a 220-l reactor whose inner atmosphere had been thoroughly replaced with nitrogen was placed a mixture of 97.9 l of butane, 400 g of an ocherous solid catalyst obtained in the same manner as in section (d) of Referential Example (content of titanium atom: 2.4% by weight, content of phthalic ester: 16.8% by weight), 2.6 moles of triethylaluminum and 0.384 mole of phenyltrimethoxysilane. Propylene monomer was allowed to react with the mixture at 16° C. for 4.7 hours. Thereafter, the resulting prepolymerization catalyst was recovered, separated from the solvent, and dried at 60° C. for 3 hours to obtain a solid catalyst component with a prepolymerization ratio (PP/cat.) of 99 g-PP/g-cat. A part of the solid catalyst component was deashed and roll-milled. The roll-milled product showed a melting point (Tm) of 166° C. as determined by DSC.

Production of Random Copolymer

Copolymerization of propylene and butene-1 was carried out by using a fluidized bed reactor having an inner volume of 1000 ml and equipped with a stirrer as follows. Recycling nitrogen gas was fed from the lower part of the reactor at a flow rate of 140 m$^3$/hr. Then 60 kg of propylene-butene-1 copolymer particles which had been dried and had surrounding atmosphere replaced with nitrogen beforehand was fed to serve for dispersing the catalyst, and the polymer particles were kept in a fluidized state. The inner pressure of the reactor was elevated up to 12.5 kg/cm$^2$G with propylene. The prepolymerization catalyst, triethylaluminum and cyclohexylethyldimethoxysilane were fed into the reactor in a rate of 144.8 g/hr, 38.0 mmoles/hr and 1.42 mmoles/hr, respectively. Then, hydrogen, propylene and butene-1 were fed so as to give a hydrogen concentration of 0.14% by mole and a butene-1 concentration of 22.8% by mole. The temperature of the fluidized bed was adjusted to 65° C. to initiate the polymerization. Part of the produced polymer particles were successively withdrawn from the reactor into a silo with the aide of pressure difference while maintaining 60 kg of the produced polymer particles remained in the reactor. Unreacted monomers were removed from the withdrawn polymer particles. Then, methanol and Irganox® 1076 were supplied to the monomer-free polymer particles in an amount of 0.0075 l and 0.0016 g per kilogram of the polymer particles, respectively. The resulting mixture was treated with hot nitrogen at 60° C. for 2 hours. Then the thus treated mixture was further dried with hot nitrogen at 60° C. for 1.5 hours to obtain a white powdery polymer in a yield of 12.6 kg/hr. The polymer had a high intrinsic viscosity and Mw/Mn (2.68 dl/g and 5.4, respectively), so that it was granulated into pellets while subjecting it to peroxide decomposition by addition of 2,5-dimethyl-2,5-di(tert-butylperoxy)hexane. The physical properties of the pellets thus obtained are shown in Table 1. The properties of the composition containing the polymer are shown in Table 2.

COMPARATIVE EXAMPLE 3

A propylene random copolymer composition was prepared by using 100 parts by weight of Sumitomo Noblen® BH 190 G (propylene-butene-1 copolymer, mfd. by Sumitomo Chemical Co., Ltd.) as the propylene random copolymer (B) and adding thereto 0.2 part by weight of Sumilizer® BHT, 0.05 part by weight of Irganox® 1010 and 0.1 part by weight of calcium stearate. The physical properties of the propylene-butene-1 copolymer are shown in Table 1. The properties of the composition containing the propylene-butene-1 copolymer are shown in Table 2.

COMPARATIVE EXAMPLES 4, 6 AND 7

Copolymerization of propylene and butene-1 was carried out by using the same catalyst as used in Comparative Example 1 in a 3-l stirred stainless steel autoclave. The physical properties, etc. of the resulting copolymers are shown in Table 1. The properties of the compositions containing each of the copolymers obtained above are shown in Table 2.

COMPARATIVE EXAMPLES 5 AND 8

Copolymerization of propylene and butene-1 was carried out by using the same catalyst as used in Comparative Example 3 in a 3-l stirred stainless steel autoclave. The physical properties, etc. of the resulting copolymers are shown in Table 1. The properties of the compositions containing each of the copolymers obtained above are shown in Table 2.

EXAMPLE 10

The same procedures as in Example 1 were repeated except that the propylene-butene-1 copolymer used in Example 1 was replaced by the propylene-butene-1 copolymer used in Comparative Example 6 and the proportions of the copolymer and PP in compounding were varied as shown in Table 1. The properties of the composition containing the mixture of the propylene-butene-1 copolymer and PP are shown in Table 2.

EXAMPLE 11

The same procedures as in Example 1 were repeated except that the propylene-butene-1 copolymer used in Example 1 was replaced by the propylene-butene-1 copolymer prepared in Comparative Example 7 and the proportions of the copolymer and PP in compounding were varied as shown in Table 1. The properties of the composition containing the mixture of the propylene-butene-1 copolymer and PP are shown in Table 2.

TABLE 1

Properties of crystalline propylene homopolymer (A) and propylene random copolymer (B) and proportions of the two polymers in the mixture

| | Crystalline propylene homopolymer (A) | | Propylene random copolymer (B) | | |
|---|---|---|---|---|---|
| | Melting point (°C.) | Proportion (wt %) | Butene content (wt %) | Mw/Mn | Proportion (wt %) |
| Comparative Example 1 | — | — | 30.0 | 4.2 | 100 |
| Example 1 | 165 | 0.5 | 30.0 | " | 99.5 |
| Example 2 | " | 1.0 | 30.0 | " | 99.0 |
| Example 3 | " | 1.5 | 30.0 | " | 98.5 |
| Example 4 | " | 2.0 | 30.0 | " | 98.0 |
| Example 5 | " | 2.5 | 30.0 | " | 97.5 |
| Comparative Example 2 | 165 | 25.0 | 29.6 | 3.2 | 75.0 |
| Example 6 | 163 | 0.7 | 30.8 | 3.7 | 99.3 |
| Comparative Example 4 | — | — | 20.1 | 3.6 | 100 |
| Example 7 | 163 | 0.9 | 19.2 | 3.7 | 99.1 |
| Example 8 | 165 | 0.4 | 21.9 | 3.7 | 99.6 |
| Example 9 | 165 | 1.1 | 20.6 | 2.7 | 98.7 |
| Comparative Example 3 | — | — | 23.8 | 6.2 | 100 |
| Comparative Example 9 | 165 | 1.0 | 23.8 | 6.2 | 99.0 |
| Comparative Example 5 | — | — | 31.0 | 6.9 | 100 |
| Comparative Example 8 | — | — | 42.8 | 5.8 | 100 |
| Comparative Example 6 | — | — | 40.1 | 3.2 | 100 |
| Example 10 | 165 | 1.0 | 40.1 | 3.2 | 99.0 |
| Comparative Example 7 | — | — | 50.2 | 4.0 | 100 |
| Example 11 | 165 | 0.5 | 50.2 | 4.0 | 99.5 |

TABLE 2

Properties of propylene random copolymer composition

| | Boiling n-heptane insoluble in composition (wt %) | Sheet Total haze (%/mm) | OPP film Total haze (%) | OPP film Heat seal temperature (°C.) |
|---|---|---|---|---|
| Comparative Example 1 | 0.1 | 28.2 | 3.0 | 77 |
| Example 1 | 55.3 | 26.0 | 0.4 | 80 |
| Example 2 | 51.3 | 23.4 | 0.3 | 76 |
| Example 3 | 59.5 | 24.9 | 0.3 | 73 |
| Example 4 | 50.7 | 26.9 | 0.4 | 75 |
| Example 5 | 39.4 | 23.8 | 0.3 | 73 |
| Comparative Example 2 | 37.5 | 29.4 | 1.3 | 84 |
| Example 6 | 35.0 | 15.6 | 0.3 | 71 |
| Comparative Example 4 | 23.7 | 50.0 | 6.5 | 102 |
| Example 7 | 45.4 | 43.0 | 0.2 | 100 |
| Example 8 | 71.0 | 30.8 | 0.3 | 88 |
| Example 9 | 49.7 | 45.5 | 0.3 | 94 |
| Comparative Example 3 | 46.0 | 51.7 | 0.3 | 80 |
| Comparative Example 9 | 46.3 | 38.9 | 0.4 | 80 |
| Comparative Example 5 | 45.9 | 31.5 | 0.5 | 57 |
| Comparative Example 8 | 37.0 | 24.0 | 1.0 | 54 |
| Comparative Example 6 | 0.3 | 17.2 | 1.0 | 54 |
| Example 10 | 53.5 | 11.0 | 0.4 | 60 |
| Comparative Example 7 | 0.4 | 12.1 | 0.7 | 45 |
| Example 11 | 30.0 | 8.0 | 0.4 | 49 |

The present invention provides a propylene copolymer composition which gives molding articles having a good balance between solvent resistance and transparency and exhibits a quite satisfactory heat sealability when formed into film.

What is claimed is:

1. A propylene random copolymer composition comprising, a mixture consisting of (A) 0.05–2.7% by weight of a crystalline propylene homopolymer or copolymer of propylene copolymerized with about 7% or less of an α-olefin other than propylene and (B) 97.3–99.95% by weight of a random copolymer of propylene and at least one α-olefin having 4 to 10 carbon atoms, wherein the copolymer (B) has a bound propylene content of 40–85% by weight and a Mw/Mn of not more than 5.5.

2. The composition of claim 1, wherein said composition does not contain a nucleating agent.

3. The composition of claim 1, wherein the crystalline propylene polymer (A) is present in an amount of 0.1 to 2.5% by weight.

4. The composition of claim 3, wherein the crystalline propylene polymer (A) is present in an amount of 0.3 to 2.5% by weight.

5. The composition of claim 4, wherein the crystalline propylene polymer (A) is present in an amount of 0.4 to 2.5% by weight.

6. The composition of claim 1, wherein the at least one α-olefin having 4 to 10 carbon atoms is butene-1.

7. The composition of claim 1, wherein the crystalline copolymer (A) comprises 7% by weight or less of the at least one α-olefin having 4 to 10 carbon atoms.

8. The composition of claim 1 wherein the copolymer (B) has a Mw/Mn of not more than 4.2.

* * * * *